Sept. 22, 1964  A. D. MOCKABEE  3,149,873
WEED PICKER
Filed July 13, 1961

INVENTOR.
ALLAN D. MOCKABEE
BY Hazard & Miller
ATTORNEYS 3,149,873
WEED PICKER
Allan D. Mockabee, 7852 Cramer Ave., Sun Valley, Calif.
Filed July 13, 1961, Ser. No. 123,797
1 Claim. (Cl. 294—50.5)

This invention relates to weed pullers and is particularly adapted for use in the removal of weeds which are deep rooted.

It is an object of the invention to provide a weed puller which can be operated easily and comfortably from a standing position and wherein the weed and a small core of earth can be removed from the ground and discharged from the device with a minimum of effort.

Another object of the invention is to provide a weed puller wherein a pedal or similar foot pressure member is utilized to force the device into the ground, and the same foot member is actuated to discharge the weed and core of earth removed with it.

A further object of the invention is to provide a weed puller having a tubular earth entrance lower end and a core expelling plunger wherein means is provided for normally maintaining the plunger in its upper or retracted position, in which position the device can be forced into the ground and wherein the plunger can be readily released from its retracted position to expel a core of earth from the tubular portion.

A further object of the invention is to provide a weed puller which removes weeds and cores of earth, thereby forming holes in the turf from which the weeds are extracted to aerate the ground and facilitate watering of the ground.

The above and other objects will more fully appear from the following description in connection with the accompanying drawing, in which.

Figure 1:
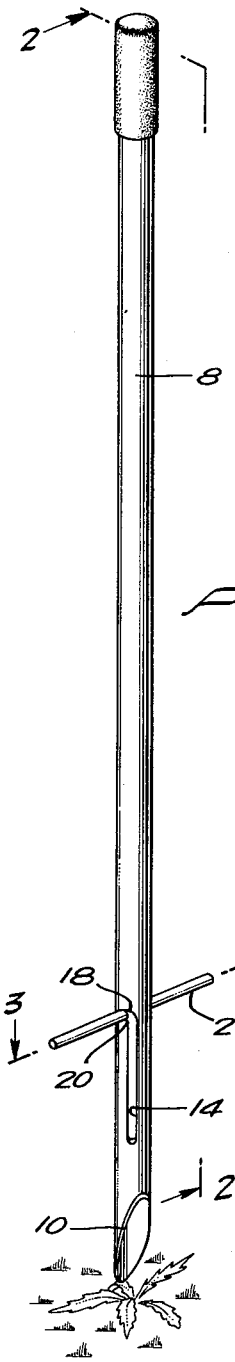
FIG. 1 is a perspective view of an embodiment of the invention.

The device includes a body 8 which may be of tubular construction throughout and which is provided with a tapered and sharpened lower end portion 10 adapted to enter the ground relatively freely.

Slidable in the tubular body 8 is a plunger 12 which may be of tubular construction with a plug 14' suitably secured as by a press fit in the lower end thereof. The tubular body 8 is provided with a pair of longitudinal slots 14 whose upper ends are provided with lateral extensions 16. Each extension 16 has a grooved upper edge 18, and where the extension 16 merges with the longitudinal slot 14, there is a slight upward projection of the metal 20 so that the extension itself on its lower side is slightly lower than the projection 20.

Extending through the upper portion of the plunger 12 is a rod 22 which constitutes a foot member or pedal. This rod also extends outwardly through the slots 14 at each side of the tubular body 8. Thus, the plunger 12 can move vertically where the foot member 22 moves similarly in the slot 14, and at the upper end of the slot, the plunger and foot member can be rotated slightly to cause the foot member to enter the slot extension 16.

A tension spring 24 has its lower end secured by a screw eye or staple 26 to the upper end of the plunger 12, and the upper end of said spring is hooked over the upper end of the tubular body 8 and seated in an indentation 28 in said tubular body. A suitable cup-like handle 30 fits over the upper end of the tubular body 8 and the spring 24.

Figure 4:
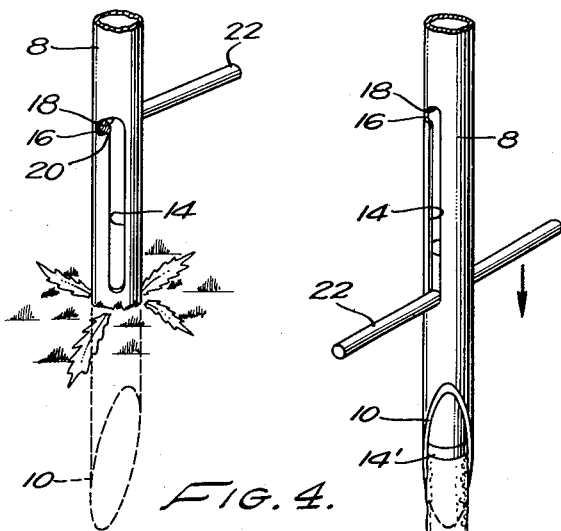
FIG. 4 is an enlarged perspective of the lower end showing the lower portion thereof in broken lines embedded in the ground and portions in full line above the ground.
Figure 5:
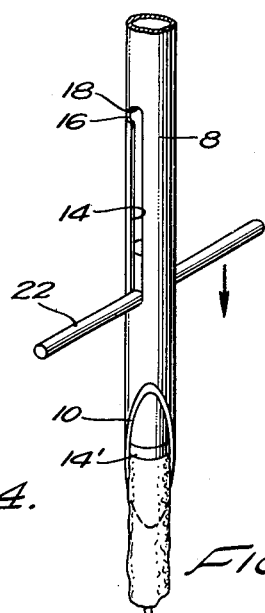
FIG. 5 is a fragmentary perspective of the lower end portion with the foot member and plunger in the expelling position.
Figure 2:
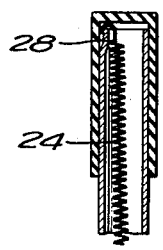
FIG. 2 is a vertical sectional view taken approximately on the line 2—2 of FIG. 1 with intermediate portions broken away.
Figure 3:
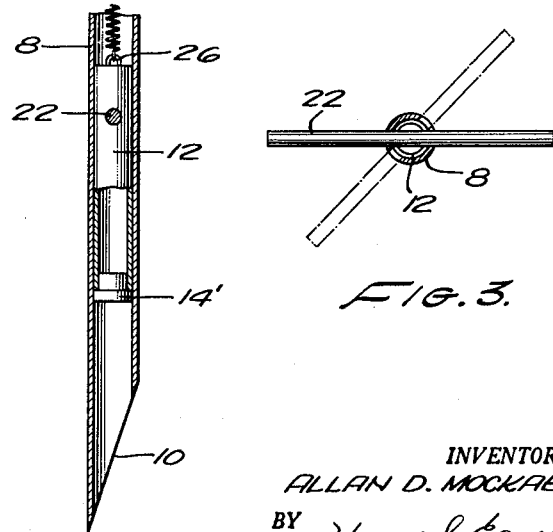
FIG. 3 is a section taken approximately on the line 3—3 of FIG. 1 showing the foot-actuated plunger operator in alternate positions in full and broken lines.

The tension spring 24 is also placed under torsion so that when the plunger 12 and foot member 22 are in their lower position, as shown in FIG. 5, the spring 24 will pull the plunger and foot member upwardly, the foot member at either side of the body will engage the upper grooved portion 18 of the slot extension 16 and tend to be deflected into the extension. To facilitate movement of the foot member into the slot extension 16, the torsion of the spring will twist the plunger 12 and foot member to move the foot member into the extension and to retain it there. When the device is placed in position over the central portion or main root of a weed such as illustrated in FIG. 1, the foot is placed upon one end of the foot member 22 and the tool is pressed into the ground as shown in FIG. 4. In order to keep the foot member 22 from slipping out of the slot extension 16, I provide the slight upward extension of the metal of the tubular body at 20. However, when discharge of a plug of dirt and a weed from the device is desired, it is necessary only to suspend the end of the device above the ground and push the foot member 22 out of the extension 16 and thence downwardly in the slot 14, moving the plunger 12 with it.

In actual practice the device can be pushed into the ground and can be removed, and the plunger removed to its discharge position without removing the foot from the foot member. As soon as the foot is removed, the plunger and foot member will return to the position of FIG. 1 and the device is ready for reinsertion in the ground.

It will of course be understood that various changes can be made in the form, details, arrangement and proportions of the device without departing from the spirit of the invention.

I claim:

A weed puller including a body having a lower tubular portion open at its lower end, a plunger movable in said tubular portion from an upper retracted position to a lower weed and earth expelling position, said tubular portion having a slot extending longitudinally therealong, an abutment on said body at the upper end of said slot, a foot pedal connected to said plunger and extending outwardly of said body portion and shiftable in a plane transversely of the body to an abutment-engaging position to retain the foot pedal against movement longitudinally of the body from its retracted position, and spring means connected between the plunger and foot pedal, as a unit, and the body, said spring means yieldably biasing the plunger and foot pedal axially and rotationally relative to said tubular portion to the retracted position of the plunger and to the abutment-engaging position of the foot pedal.

References Cited in the file of this patent
UNITED STATES PATENTS

| 471,767 | Cross | Mar. 29, 1892 |
| 1,260,264 | Huszar | Mar. 19, 1918 |
| 1,770,751 | Hall | July 15, 1930 |
| 2,030,770 | Smith | Feb. 11, 1936 |

FOREIGN PATENTS

| 10,518 | Great Britain | of 1905 |
| 12,252 | Great Britain | of 1901 |
| 353,701 | Great Britain | July 30, 1931 |
| 598,340 | Germany | June 9, 1934 |